Jan. 2, 1923.

W. B. BENNITT.
PAWL AND RATCHET GEARING.
FILED JAN. 26, 1917.

1,440,438

4 SHEETS-SHEET 1

WITNESSES:
Ed Plinke.
W. R. Coley

INVENTOR
William B. Bennitt.
BY
Wesley H. Carr
ATTORNEY

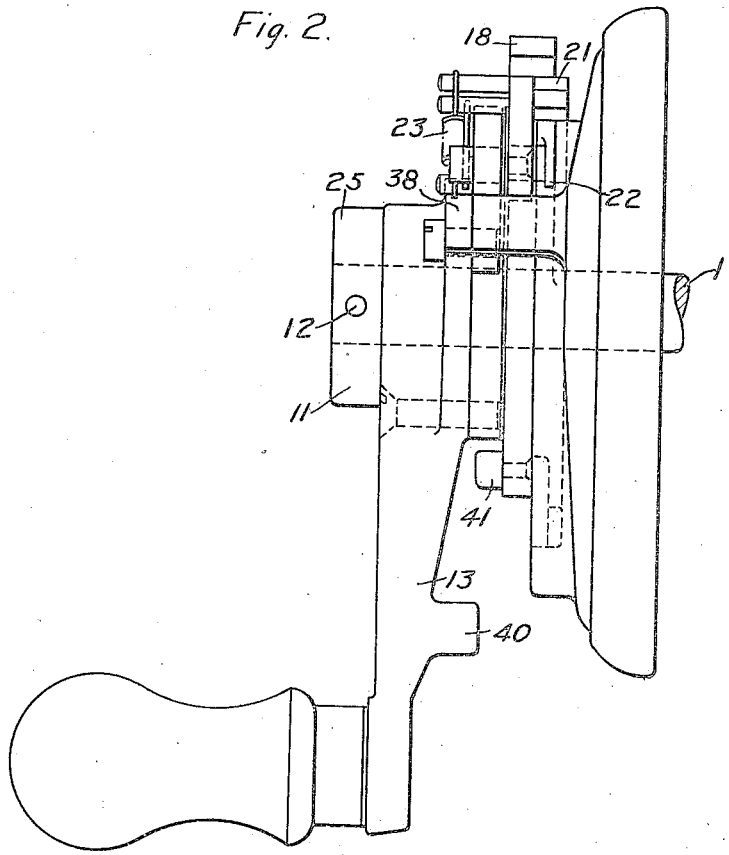

Jan. 2, 1923.
W. B. BENNITT.
PAWL AND RATCHET GEARING.
FILED JAN. 26, 1917.
1,440,438
4 SHEETS-SHEET 3
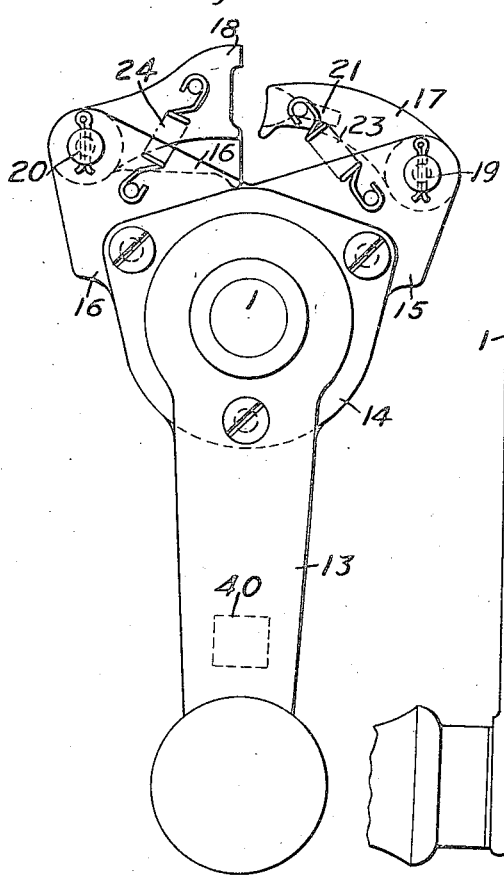
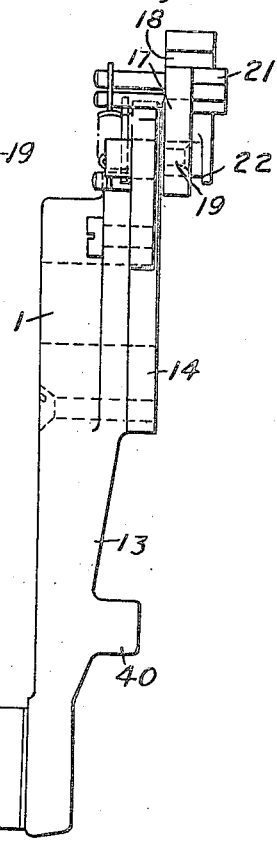
WITNESSES:
Ed Plinke.
W. R. Coley
INVENTOR
William B. Bennitt.
BY
Wesley G. Carr
ATTORNEY Patented Jan. 2, 1923.

1,440,438

UNITED STATES PATENT OFFICE.

WILLIAM BRABINER BENNITT, OF ASHTON-ON-MERSEY, ENGLAND, ASSIGNOR TO WESTINGHOUSE ELECTRIC & MANUFACTURING COMPANY, A CORPORATION OF PENNSYLVANIA.

PAWL AND RATCHET GEARING.

Application filed January 26, 1917. Serial No. 144,654.

*To all whom it may concern:*

Be it known that I, WILLIAM B. BENNITT, a subject of the King of Great Britain, and a resident of Ivybank, Moss Lane, Ashton-on-Mersey, in the county of Chester, England, have invented a new and useful Improvement in Pawl and Ratchet Gearings, of which the following is a specification.

My invention relates to pawl-and-ratchet gearing and particularly to gearing for imparting a rotary motion to a shaft by predetermined steps, such as, for instance, is required for operating electric-motor controllers, circular-dial switches and the like.

The object of my invention is to construct a mechanism by means of which a shaft may be rotated in one direction in steps, by means of a suitable handle, but so arranged that, between steps, the handle must be moved in the opposite direction a predetermined amount to enable the pawl to take up a fresh tooth in the ratchet and then in the forward direction through a distance greater than that through which it was moved backwardly, whereby the position of the handle will show through how many steps the shaft has been rotated.

Another object of the invention is to provide a double-acting structure of the type in question, whereby a shaft may be rotated in opposite directions from a given zero or datum mark.

According to the present invention, the ratchet teeth are formed on a cam-shaped plate, that is to say, each successive ratchet tooth is located nearer to the axis of rotation of the plate, than the preceding tooth and steps are provided which prevent the movement of the handle and pawl, and consequent rotation of the ratchet plate and shaft, in a forward direction beyond definite positions, which are different for each tooth of the ratchet. A fixed cam is also provided for the purpose of guiding the pawl in such manner as to cause it to engage a definite tooth of the ratchet, depending on the position to which the ratchet has previously been moved. In cases where a double pawl-and-ratchet mechanism is provided for the purpose of obtaining a rotation by definite steps in either direction, the fixed cams are adapted also to prevent the engagement of the ratchet teeth with the pawl that is not being employed to rotate the ratchet.

Figure 1:
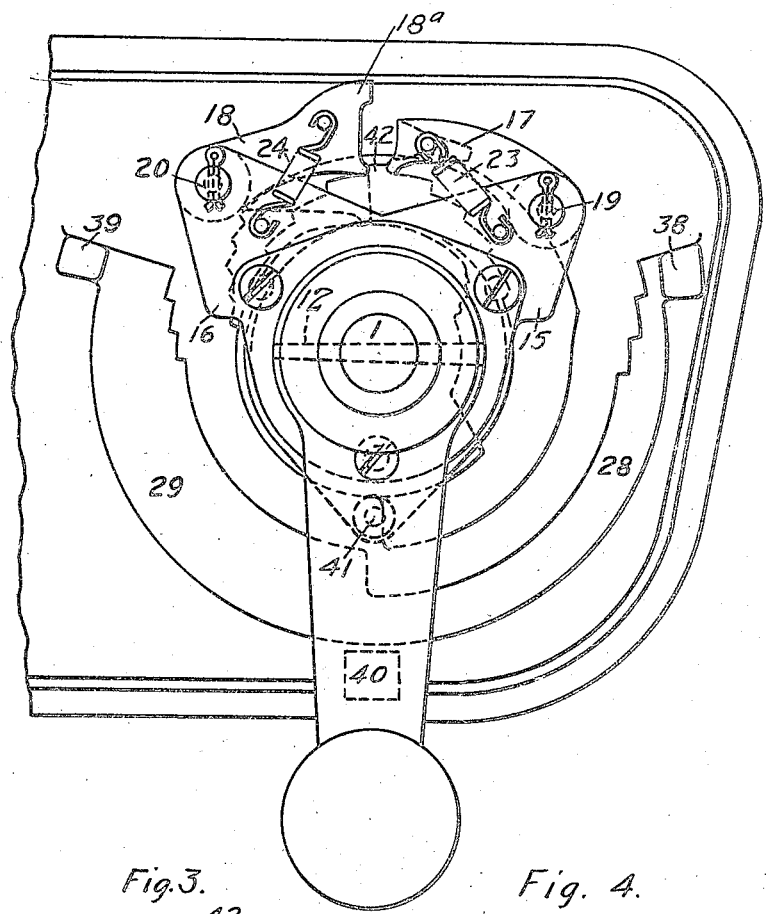

In order that the nature of the invention may be clearly understood, it will be described with reference to the accompanying drawings, which illustrate the improved mechanism for the purpose of rotating the shaft of an electric-motor-controller by predetermined steps in either direction from a fixed zero or datum position. Fig. 1 is a plan view, and Fig. 2 is a view in side elevation, of the mechanism. Figs. 3 to 13 are views of various parts, as hereinafter explained.

Figures 3, 4:
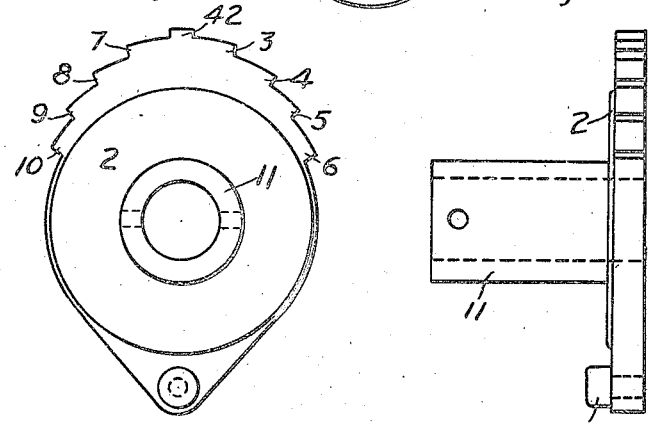

Referring now to the drawings, the shaft 1 to be rotated has a ratchet-plate 2 firmly secured thereto that is provided with two sets of ratchet teeth numbered 3 to 6 and 7 to 10, respectively. The ratchet-plate is provided with a sleeve 11 surrounding the outer end of the shaft 1 to which it is firmly secured by a transverse pin 12. A plan view and a side view of the ratchet-plate and sleeve are shown in Figs. 3 and 4 respectively, from which it will be seen that the ratchet teeth are formed on a cam-shaped plate in such manner that each successive tooth of each set is located nearer to the axis of rotation of the plate than the preceding tooth.

A handle 13 is mounted to rotate loosely upon the sleeve 11 of the ratchet-plate and has secured to it a plate 14 (see Figs. 5 and 6) that is provided with side extensions or ears 15 and 16 to which are pivoted pawls 17 and 18 by means of pivots 19 and 20, respectively. The pawls 17 and 18 are shown in detail in Fig. 7 to Fig. 10, inclusive. The pawl 17 is provided with an extension or boss 21, and the pawl 18 with an extension or wing 22, for purposes hereinafter explained; the pawls being respectively provided with springs 23 and 24 to cause them to engage the ratchet teeth. The handle is maintained in position on the sleeve 11 by means of a washer 25, through which extends the transverse pin 12.

Figure 12:
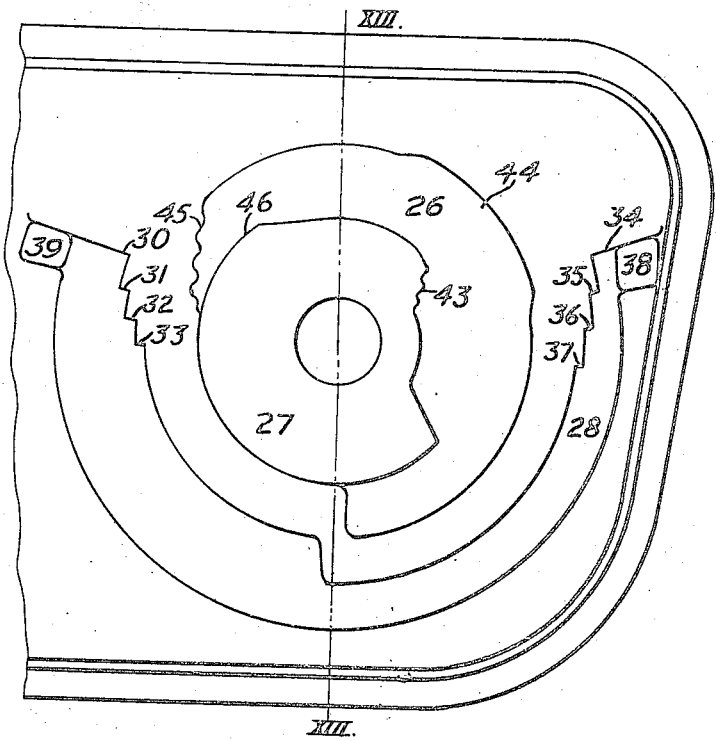

Attached to a fixed part of the apparatus, the cover of the controller, for example, as indicated in the drawing, are cam discs 26 and 27, the shapes of which will be clearly seen from Fig. 12 of the drawing, and surrounding the cam discs, are annular plates 28 and 29, the inner surfaces of which are provided with notches or steps 34 to 37 and 30 to 33, respectively. The annular plates are also provided near their outer ends, with projecting steps 38 and 39 that are adapted to engage a projection 40 on the handle to thereby limit the movement of the handle in either direction. The ratchet-plate 2 is provided with a projection or boss 41 which is adapted to engage the ears 15 and 16, for a purpose to be hereinafter described.

Figure 13:
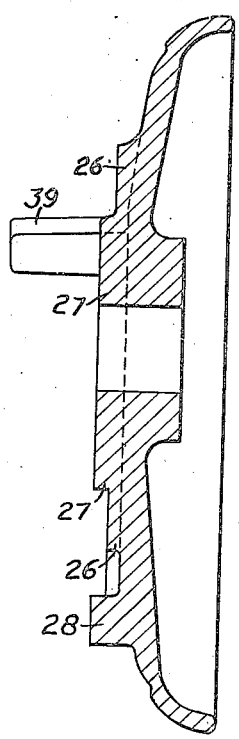

The fixed cam discs 26 and 27 are not in the same plane, as is indicated in Fig. 13, which is a section on the line XIII—XIII of Fig. 12, and the wing 22 of the pawl 18 is arranged to engage the edge of cam disc 27, the boss 21 of pawl 17 being arranged to engage the edge of cam disc 26.

The operation of the mechanism is as follows. In the illustrated zero or datum position, both pawls engage a tooth 42 that is located between the two sets of ratchet teeth 3 to 6 and 7 to 10. The movement of the handle in the clockwise direction for example, by reason of the engagement of the pawl 18 with the tooth 42, moves the ratchet-plate 2 and shaft 1 a certain distance until the head 18ᵃ of the pawl 18 comes into engagement with the first step 34 on the fixed annular plate 28. This prevents further movement of the mechanism in the clockwise direction. The handle is now moved backwards, that is to say, in the counter-clockwise direction, to a certain distance, dragging the pawl 18 over the ratchet until it falls into engagement with the tooth 7, which it is permitted to do by reason of the cam disc 27 being cut away at the part 43 which, at this time, is located opposite the wing 22 of the pawl 18. The cam disc 27 is, however, shaped so as to engage the wing 22 and prevent the pawl 18 from engaging the tooth 8 of the ratchet if it is moved too far in the counter-clockwise direction.

A movement of the handle in the clockwise direction will now rotate the ratchet plate and shaft through a further step. It will be observed that, owing to the second tooth 7 of the ratchet being nearer to the axis of rotation than the tooth 42, the pawl 18 will escape the step 34 and can move far enough to engage with the next step 35 in the annular plate 28. A further movement of the handle in the counter-clockwise direction will drag the pawl 18 a further distance over the ratchet, and the gap 43 in the cam 27 will permit of the pawl to engage the third tooth 8 of the ratchet. As this tooth is still nearer to the axis of rotation, the pawl 18 will now be enabled to pass the second step 35 of the fixed plate 28 and engage the third step 36.

During the time that the ratchet plate is being moved in the clockwise direction by means of the pawl 18, the pawl 17 is prevented from engaging the teeth 42 and 3 to 6 of the ratchet by reason of the engagement of the boss 21 with the edge 44 of the fixed cam disc 26.

Movement of the ratchet and shaft in the reverse direction back to the zero or datum position may be effected at any time by rotating the handle sufficiently far to cause the ear 16 to engage the boss 41 of the ratchet-plate 2.

Movement of the ratchet-plate and shaft in the counter-clockwise direction from the zero or datum mark is effected by engagement of the pawl 17 with the ratchet teeth 42 and 3, 4, 5, 6 in succession, the movement being stopped at predetermined points by means of the steps 30 to 33 in the fixed plate 29, in a similar manner to that hereinbefore described for the movement in the clockwise direction. The cam 26 is cut away at the part 45 to enable the pawl 17 to engage the successive ratchet teeth, and the cam 27 is provided with a projecting part 46 which engages the wing 22 of the pawl 18 and prevents it from engaging the teeth of the ratchet in a manner similar to that previously described in connection with the boss 21 of the cam 17 and the part 44 of the fixed cam 26. Movement of the ratchet and shaft in the reverse direction will be obtained by engagement of the ear 15 with the boss 41.

The mechanism shown in the drawing is adapted to rotate the shaft by successive steps in either direction from the zero or datum position. It will be readily understood, however, that the shaft may be arranged to be moved by steps in one direction only by means of a single pawl engaging appropriate ratchet teeth, in which case, one of the fixed cams 26, 27 and one of the stepped plates 28, 29 will be omitted.

The structural details of the device may be considerably varied according to the nature of the apparatus to which the mechanism is to be applied; for example, the steps and ratchet teeth which are shown as being formed by notches in the edges of suitably shaped plates may be replaced by properly spaced pins, and other variations may be made without departing from the spirit and scope of my invention. I desire, therefore, that only such limitations shall be imposed as are indicated in the appended claims.

I claim as my invention:

1. A mechanism comprising a driving member, a pawl member actuated thereby, a notched member normally engaging said pawl member to be driven thereby, and a stationary notched member for engaging said pawl member under predetermined conditions, the relation of parts being such that successive movements of the driving member in alternately opposite directions effects a step-by-step movement of the driven member.

2. A mechanism comprising a driving member, a pawl member actuated thereby, a notched member having a plurality of differently-positioned teeth, means for normally effecting the engagement of said pawl member with one of said teeth to thereby drive the notched member, and a stationary notched member having a plurality of differently-positioned teeth for successively engaging said pawl member.

3. A mechanism comprising a driving rotatable member, a pawl member carried thereby, a rotatable ratchet member having a plurality of teeth of successively decreasing radius, means for initially effecting the engagement of said pawl member with the tooth of greatest radius, to thereby drive the ratchet member, and a stationary notched member having a plurality of teeth of successively varying radius for consecutively engaging said pawl member.

4. A mechanism comprising a driving rotatable member, a pawl carried thereby, a concentrically related rotatable ratchet member having a plurality of teeth of successively decreasing radius, means for initially effecting the engagement of said pawl member with the tooth of greatest radius to thereby drive the ratchet member, and a stationary notched member having a plurality of teeth of successively decreasing radius for consecutively engaging the said pawl member as the driving member is actuated alternately in opposite directions.

5. In a pawl-and-ratchet mechanism, the combination with a rotatable driving member, of a pawl carried thereby, a concentrically rotatable ratchet member initially engaging said pawl to be driven thereby and having a plurality of teeth of successively decreasing radius, and stationary notched means interposed in the path of said driving member to prevent movement thereof and consequent forward rotation of the ratchet member beyond each notch of said stationary means until the pawl is backwardly actuated and engages a subsequent ratchet-member tooth.

6. A mechanism comprising a rotatable handle member, a pawl carried thereby, a concentrically rotatable ratchet-plate initially engaging said pawl to be driven thereby and having a plurality of teeth of successively decreasing radius, and a stationary annular notched member interposed in the path of said pawl to prevent movement thereof and consequent rotation of the ratchet-plate beyond each notch of said notched member until the handle member is backwardly actuated to allow the pawl to engage the next ratchet-plate tooth.

7. A mechanism comprising an oscillatory driving member, a pawl carried thereby, a rotatable ratchet member initially engaging said pawl to be driven thereby, and a stationary cam surface for causing said pawl to engage a predetermined ratchet tooth dependent upon the position to which the ratchet member has been previously oscillated.

8. A mechanism comprising a rotatable driving member, a pawl carried thereby, a rotatable ratchet member initially engaging said pawl to be driven thereby, stationary notched means for preventing movement of the driving member and consequent rotation of the ratchet member beyond predetermined positions that respectively correspond to the ratchet teeth, and a cam surface for causing said pawl to engage the next ratchet-member tooth upon a backward movement of the driving member.

9. A mechanism comprising a rotatable handle member, a pawl carried thereby, a concentrically rotatable ratchet-plate initially engaging said pawl to be driven thereby and having a plurality of teeth of successively decreasing radius, and a stationary annular notched member interposed in the path of said pawl to successively prevent movement thereof and consequent rotation of the ratchet-plate beyond the notches of said notched member, and a cam surface for causing said pawl to engage the next ratchet-plate tooth upon preliminary backward and subsequent forward movement of the driving member.

10. A mechanism comprising a movable member, pawl members carried thereby and corresponding to opposite directions of movement, a ratchet member having a tooth engaging said pawl members to be actuated thereby in the one or the other direction, means co-operating with said pawl members for limiting the movement of said ratchet member in a step-by-step manner in either direction, and means for rendering the initially unused pawl member inoperative during the step-by-step operation.

11. A mechanism comprising a rotatable driving member, pawls carried thereby and respectively corresponding to opposite directions of rotation, a rotatable ratchet member initially engaging said pawls to be driven thereby in the one or the other direction and having two sets of teeth of successively decreasing radius, means for preventing movement of the driving member and consequent rotation of the ratchet member beyond predetermined positions that respectively correspond to the ratchet teeth, and means for rendering the initially unused pawl member inoperative during the remaining rotative movement of the ratchet member.

12. A mechanism comprising a rotatable driving member, pawls carried thereby and respectively corresponding to opposite directions of rotation, a rotatable ratchet-plate having an intermediate tooth initially engaging said pawl members to be driven thereby in the one or the other direction and also having, on each side of said intermediate tooth, sets of teeth of successively decreasing radius, stationary annular notched members interposed in the path of the respective pawls to prevent movement thereof and consequent rotation of the ratchet-plate in the initially selected direction beyond the notches of the corresponding notched member, and stationary cam surfaces for causing the used pawl to engage the next ratchet-plate tooth upon preliminary retrogressive and subsequent progressive movement of the driving member and for rendering the initially unused pawl inoperative during the remaining rotative movement of the ratchet-plate.

13. In a pawl-and-ratchet mechanism, the combination with a rotatable driving member, of a pawl carried thereby, a concentrically rotatable ratchet member initially engaging said pawl to be driven thereby, stationary notched means interposed in the path of said driving member to prevent movement thereof and consequent forward rotation of the ratchet member beyond each notch of said stationary means until the pawl is backwardly actuated and engages a subsequent ratchet-member tooth, and means on the ratchet-member to be engaged by a portion of said driving member upon a relatively long backward movement thereof to effect the return of parts to the initial positions.

14. A mechanism comprising a rotatable driving member, pawls carried thereby and respectively corresponding to opposite directions of rotation a rotatable, ratchet-plate having an intermediate tooth initially engaging said pawl members to be driven thereby in the one or the other direction and also having, on each side of said intermediate tooth, sets of teeth of successively decreasing radius, stationary annular notched members interposed in the path of the respective pawls to prevent movement thereof and consequent rotation of the ratchet-plate in the initially selected direction beyond the notches of the corresponding notched member, stationary cam surfaces for causing the used pawl to engage the next ratchet-plate tooth upon preliminary retrogressive and subsequent progressive movement of the driving member and for rendering the initially unused pawl inoperative during the remaining rotative movement of the ratchet-plate, and a single means on the ratchet member to be engaged by a portion of said driving member upon a relatively long retrogressive movement thereof to effect the return of parts to the initial positions.

15. A mechanism comprising a driving member successively rotatable in opposite directions, a member driven thereby during the motion of said driving member in one of said directions, and a plurality of stationary stops for successively limiting the degree of movement of said driving member.

16. A mechanism comprising a driving member successively rotatable in opposite directions, a member driven thereby during the motion of said driving member in one of said directions, and means for successively limiting the degree of movement of said driving member in said direction, the degree of movement in said direction being greater than the degree of movement in said other direction, whereby the position of said driving member indicates the position of said driven member.

In testimony whereof, I have hereunto subscribed my name this 22nd day of December 1916.

WILLIAM BRABINER BENNITT.